(No Model.)
J. A. WEIGERT & H. OYEN.
COMBINED PLUMB AND LEVEL.
No. 586,082.
Patented July 6, 1897.
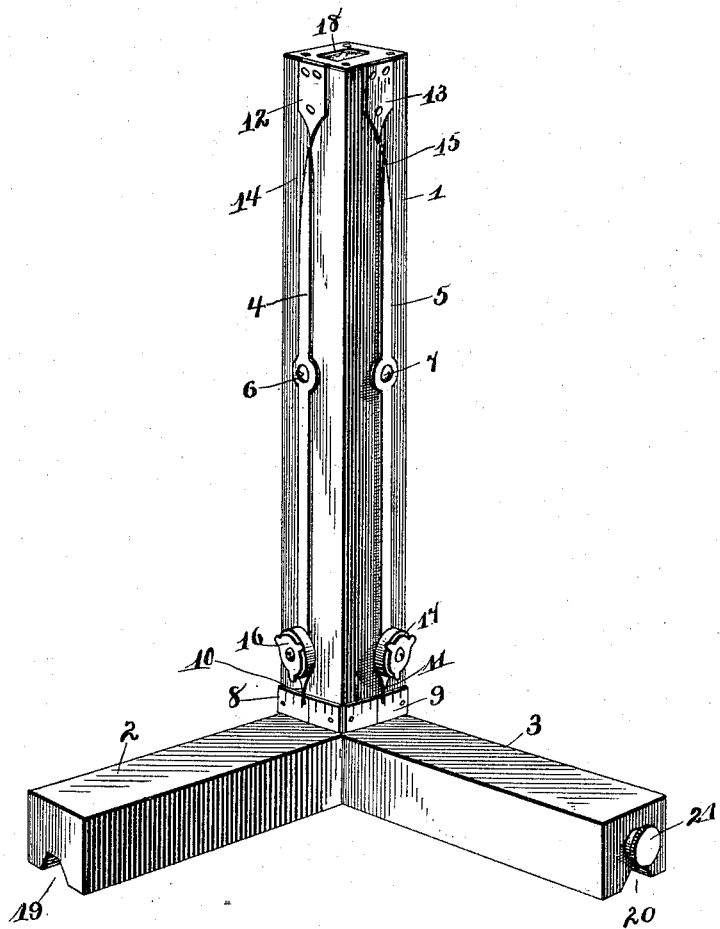
Witnesses:
E. C. Wurdman
J. J. Williamson
Inventors:
Joseph A. Weigert
Henry Oyen
By Geo. H. Holgate
Attorney

UNITED STATES PATENT OFFICE.

JOSEPH A. WEIGERT AND HENRY OYEN, OF PHILADELPHIA, PENNSYLVANIA.

COMBINED PLUMB AND LEVEL.

SPECIFICATION forming part of Letters Patent No. 586,082, dated July 6, 1897.

Application filed September 23, 1895. Renewed May 18, 1897. Serial No. 637,123. (No model.)

*To all whom it may concern:*

Be it known that we, JOSEPH A. WEIGERT and HENRY OYEN, citizens of the United States, residing at Philadelphia, in the county of Philadelphia and State of Pennsylvania, have invented certain new and useful Improvements in a Combined Plumb and Level, of which the following is a specification.

Our invention relates to a new and useful improvement in plumbs, and has for its object to provide such a device that will be capable of use in angular corners or against two surfaces at right angles to each other and which shall indicate the inclination of both of said surfaces at one and the same time or which may be used for leveling surfaces.

With these ends in view our invention consists in the details of construction and combination of elements hereinafter set forth, and then specifically designated by the claim.

In order that those skilled in the art to which this invention appertains may understand how to make and use the same, we will describe its construction and operation in detail, referring by number to the accompanying drawing, forming a part of this specification.

Referring to the drawing, which represents our improvement in perspective, 1 is an upright secured to the beams 2 and 3 at their junction.

4 and 5 are pendulum-indicators pivoted at 6 and 7 to the inner surfaces of the upright 1.

8 and 9 are dials secured in proper position upon the upright for the pointers 10 and 11 to indicate the angle of the surfaces upon which the plumb is placed. In order that little or no care may be necessary to determine when the surface is plumb or horizontal, as the case may be, we provide central indicators 12 and 13, secured to the upper portion of the upright upon its two inner surfaces and in juxtaposition to the upper ends 14 and 15, respectively, of the pendulums.

16 and 17 are weights fastened to the lower ends of the pendulums and of sufficient heft to insure said pendulums maintaining a true plumb.

18 is a spirit-level of ordinary construction placed upon the upper surface of the upright, whereby the instrument may be used as a level.

The grooves 19 and 20 are formed upon the under side of the beams 2 and 3, respectively, and run their entire length and are of such shape as to adapt the instrument for use in connection with running bars or shafts, as will be readily understood. For convenience a receptacle may be formed in one or both of the beams and provided with a cap 21, by means of which small tools—such as scratch-awls, markers, and punchers—may be conveniently carried.

In practice this combination instrument has proved to be very serviceable in that it is capable of accommodating itself to a variety of uses which cannot be accomplished by the ordinary plumb-bob or spirit-level.

Slight modifications may be made in the construction and arrangement of our improved combination plumb and level, such as the omission of the spirit-level at the top or the rearrangement of the same by placing it upon some other portion of the device, or one of the pendulums may be omitted, so as to use the remaining pendulum for leveling in one direction and the spirit-level for leveling at right angles thereto, and we therefore do not wish to limit ourselves to the exact construction shown and described.

Having thus fully described our invention, what we claim as new and useful is—

In an instrument of the character described, beams 2 and 3 meeting at right angles and having suitable grooves formed upon their bottom surfaces, an upright supported by said beams at their juncture, two pendulums, one pivoted to each of the inner surfaces of said upright, dials for indicating the inclination of said instrument and a spirit-level arranged upon the upper end of said upright, as specified.

In testimony whereof we have hereunto affixed our signatures in the presence of two subscribing witnesses.

JOS. A. WEIGERT.
HENRY OYEN.

Witnesses:
S. S. WILLIAMSON,
SAMUEL L. TAYLOR.